Figure 1A:
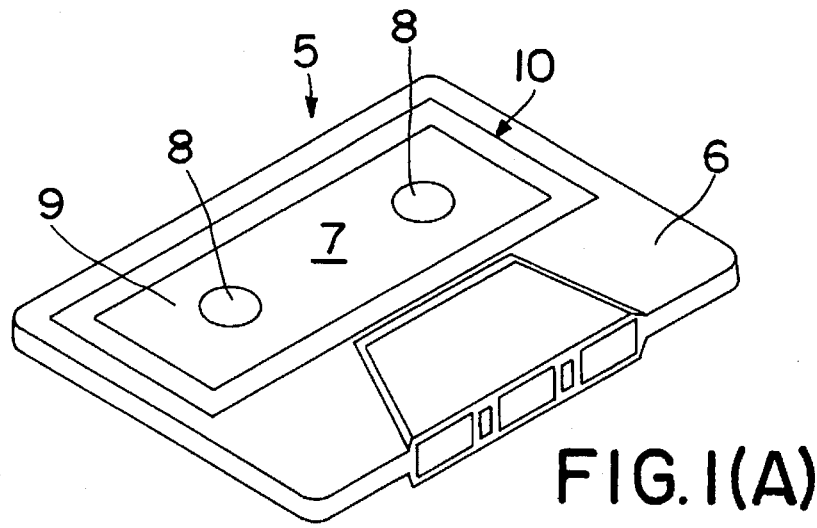

United States Patent [19]

Schoettle et al.

[11] Patent Number: 5,581,430
[45] Date of Patent: Dec. 3, 1996

[54] CONTAINER HAVING AT LEAST ONE VIEWING WINDOW, IN PARTICULAR A TAPE CASSETTE, AND VIEWING WINDOW ARRANGEMENT THEREFOR

[75] Inventors: Klaus Schoettle, Heidelberg; Joachim Eberhard, Kippenheim; Gerald-Wolfgang Borck, Ludwigshafen, all of Germany

[73] Assignee: BASF Aktiengesellschaft, Ludwigshafen, Germany

[21] Appl. No.: 486,622

[22] Filed: Jun. 7, 1995

Related U.S. Application Data

[63] Continuation of Ser. No. 236,250, May 2, 1994, abandoned, which is a continuation of Ser. No. 932,996, Aug. 20, 1992, abandoned.

[30] Foreign Application Priority Data

Aug. 24, 1991 [DE] Germany .............. 9110481 U

[51] Int. Cl.[6] ........................................ G11B 23/02
[52] U.S. Cl. ........................................... 360/132
[58] Field of Search ........................ 360/134, 132; 242/199, 198, 358, 170; D14/121, 124

[56] References Cited

U.S. PATENT DOCUMENTS

| | | | |
|---|---|---|---|
| D. 220,005 | 2/1971 | Akiyama et al. | D14/121 |
| D. 316,256 | 4/1991 | Yonehara | D14/121 |
| D. 331,053 | 11/1992 | Zucker et al. | D14/121 |
| 3,259,331 | 7/1966 | Liddle | D14/121 |
| 3,558,142 | 1/1971 | Poerrel | 360/132 |
| 4,949,210 | 8/1990 | Satoh et al. | 360/132 |
| 5,229,905 | 7/1993 | Morita | 360/132 |

FOREIGN PATENT DOCUMENTS

| | | |
|---|---|---|
| 0233028 | 10/1990 | European Pat. Off. . |
| 0416579 | 3/1991 | European Pat. Off. . |
| 2121007 | 12/1983 | United Kingdom . |
| 2142314 | 1/1985 | United Kingdom . |

OTHER PUBLICATIONS

*Patent Abstracts of Japan*, vol. 12, No. 16, p. 656, Jan. 19, 1988.
*Patent Abstracts of Japan*, vol. 15, No. 402, p. 1262, Oct. 14, 1991.
*Patent Abstracts of Japan*, vol. 14, No. 122, p. 1017, Mar. 7, 1990.

*Primary Examiner*—Robert S. Tupper
*Assistant Examiner*—Allen Cao
*Attorney, Agent, or Firm*—Keil & Weinkauf

[57] ABSTRACT

A container having a viewing window essentially comprises a housing with a window which can be fastened to it and is designed in one part as a transparent part and in another part as a masking part, in particular in the edge region. The aim is to cover over the fastening points. In addition, the advantage is obtained of using windows with a wide variety of maskings for the same housing, provided that the contours of the cutout and of the outline of housing and window are adapted at least substantially to one another. The plastic container with windows can be used for all packing and archiving purposes, in particular also as a cassette with a recording medium, for example a magnetic tape cassette.

26 Claims, 4 Drawing Sheets

CONTAINER HAVING AT LEAST ONE VIEWING WINDOW, IN PARTICULAR A TAPE CASSETTE, AND VIEWING WINDOW ARRANGEMENT THEREFOR

This application is a continuation of application Ser. No. 08/236,250, filed on May 2, 1994, now abaondoned which is a continuation of Ser. No. 07/932,996, filed on Aug. 20, 1992, now abandoned.

A container having at least one viewing window, in particular a tape cassette, the viewing window being formed by a window part which can be fastened in a cutout of the container housing at fastening points and has parts of different transparency, as well as a viewing window arrangement.

Containers of a general type and tape cassettes, specifically audio/video magnetic tape cassettes and data magnetic tape cartridges with viewing windows are known in many varied forms.

Usually the windows are welded into openings provided for them in the cassette housings, or the windows are produced together with the housings by two-color injection molding.

In two-color injection molding, changes to the shape of the window require complex mold modifications or new designs, which rule out such changes from the outset.

In the case of opaque housings, the welded-in windows are usually welded in from the rear side of the housing in order to keep the welding points out of sight.

European Patent 73010 discloses a compact cassette having a window arrangement welded into an opaque housing from the inside.

In addition, it is known from European Patent 233 028 to provide window parts for windows of video cassettes with only slightly transparent roughening above points prone to abrasion. This at most covers over isolated locations or relatively small window areas.

It is an object of the present invention to design containers with viewing windows and viewing windows for such containers with opaque or transparent housings or housing parts for unobtrusive fastening points, in particular welding points, or to make certain housing and window abutting areas visually indistinct.

We have found that this object is achieved according to the present invention if, for covering over the fastening points, the parts of different transparency are designed as a transparent part and as a masking part, the latter at least over the fastening points.

The second object is achieved if the parts of different transparency are designed as a transparent part and as a masking part, the latter having an opaqueness at least similar to the opaqueness of the housing, so that the transitional region between housing and window part is visually indistinguishable.

In this way it is advantageously possible by changing the size and/or shape of the masking part at the same time to change as a matter of course the size and/or shape of the transparent part, so as to produce completely different window parts which, however, all have the characterizing feature of masking the fastening points and/or achieving the visual indistinctness of the transitional regions between housing and window part.

At the same time, the outlines of the window parts, and consequently also the cutouts in the housings, can remain unchanged, making a great number of window shapes, more specifically shapes of the transparent part of the window part, possible and able to be used as options, without having to change the sizes and shapes of the window parts themselves.

The masking part of the window part should be arranged at the outer edge of the viewing window or at least in the vicinity of the outer edge of the window part. In the simplest case, the masking part may also be in the form of a frame or comprise elements of an outer frame. The masking part may expediently be of the same color as or a similar color to an at least partially opaque container housing. Both parts, housing and window part, may however also be partially or completely transparent, with the exception of the masking part. It is, however, also possible to use a contrasting color to the color of the housing, for example in order to achieve a three-colored effect or, by suitable covering in the region of the outer edge (for example in the case of printing or impressing) also a multi-colored effect.

The masking part, and consequently also the transparent part, of the window part may be of an irregular or regular shape in relation to the shape of the window cutout in the housing. The outer appearance of the container or the cassette and the visibility of the parts contained therein can thus be varied within broad limits. The window part can be produced as a two-color injection molding or, for example, by one of the following methods.

The masking part can be produced by imprinting after production or during the injection molding operation (in-mold method). It is also possible to form the masking part of the window part by impressing.

Welding points or riveting points on the housing are suitable as fastening points, but use may also be made of adhesive bonding points.

On the side of the window part covered over by the masking part, both welding bosses or ribs and riveting pins and holes, but also guide elements for the tape of a tape cassette, may be expediently arranged.

The invention also relates to the viewing window for the container or the tape cassette itself, which window comprises a window part fitting into the window cutout and formed in one part as a transparent part and in the other part as a masking part for fastening points on the tape cassette housing. In a practical development, the viewing window comprises a window part of transparent material, which is partly opaque for forming the masking part.

In a further development, the masking part is arranged at least in the vicinity of the outer edge of the window part. This makes it possible in practice to cover over all the fastening points which lie at the outer edge or in its vicinity in a manner according to the invention.

It is also possible to form the masking part directly as an outer frame. Furthermore, it may be necessary to form the masking part in a regular or irregular shape, for example of an appealing design. The masking part can in practice be applied as a print and/or an impression on a transparent window part. In practice it is also possible to use two-color injection molding in order to make the masking part opaque and the transparent part at least slightly transparent. For fastening, welding ribs or riveting pins and/or riveting holes, formed on the window part, may be provided on the rear side of the masking part. Guide elements, such as continuations, ribs, etc. for a tape in a tape cassette, may advantageously be provided on said covered rear side.

Embodiments of the invention are represented in the drawing and described below.

Figure 1B:
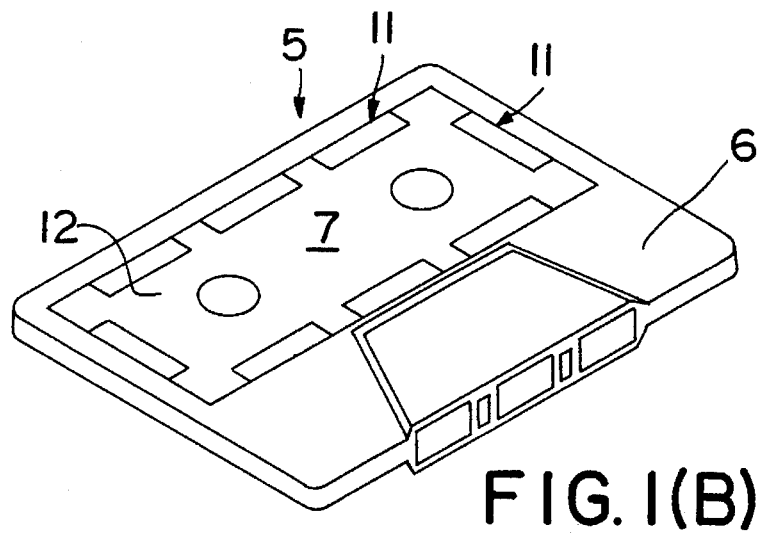
Figure 1C:
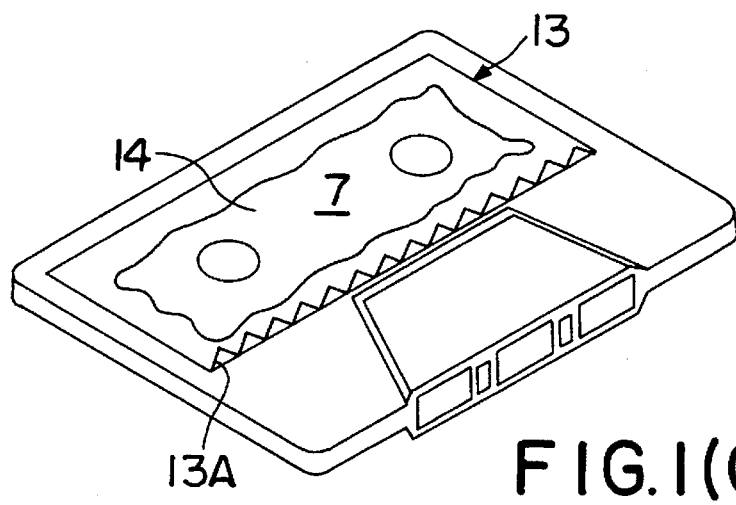
Figure 2A:
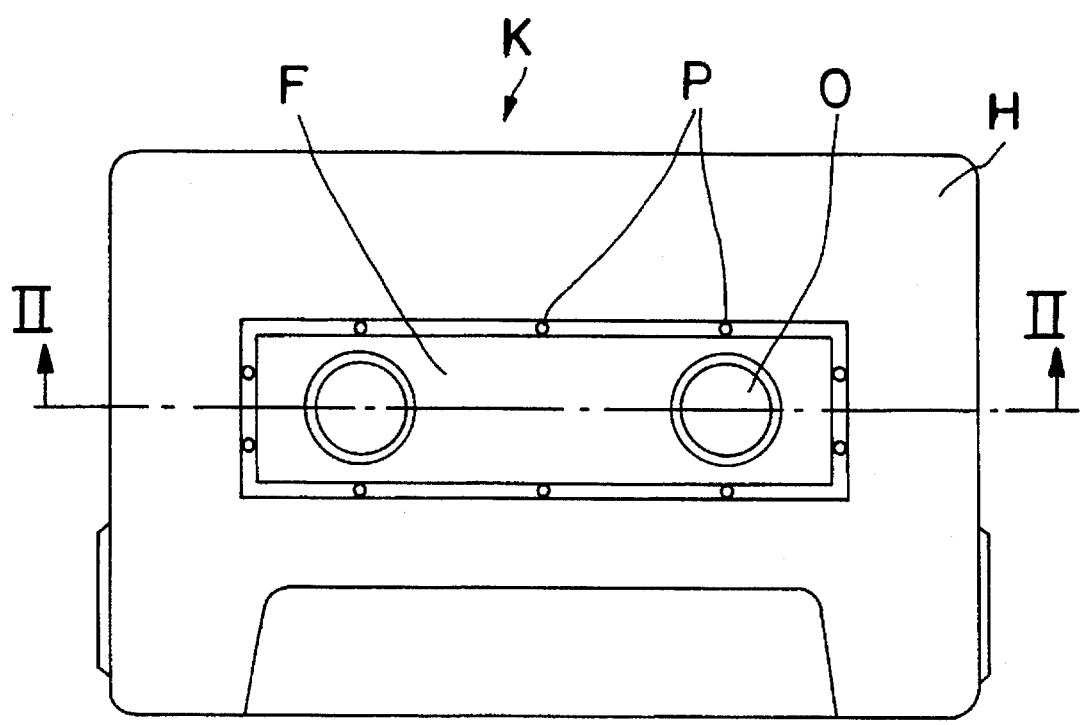
Figure 2B:
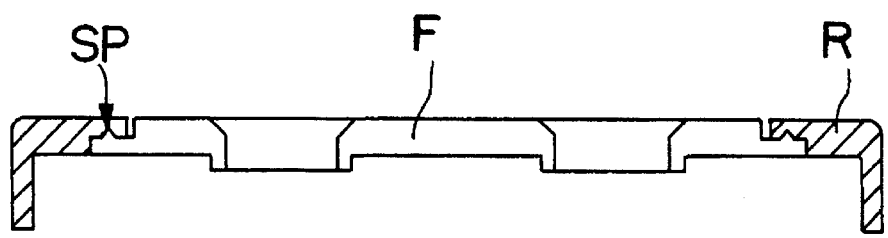
Figure 3A:
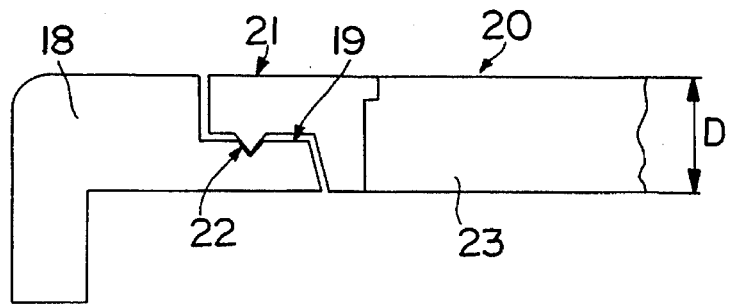
Figure 3B:
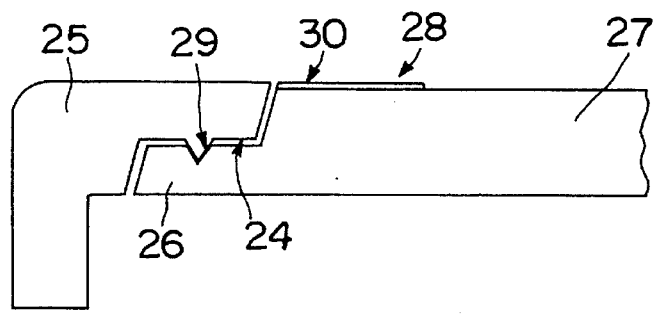
Figure 3C:
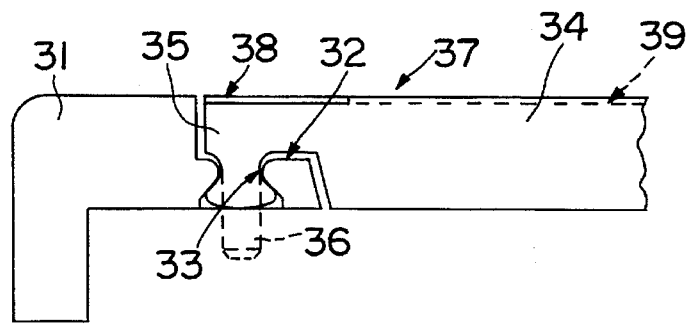
Figure 3D:
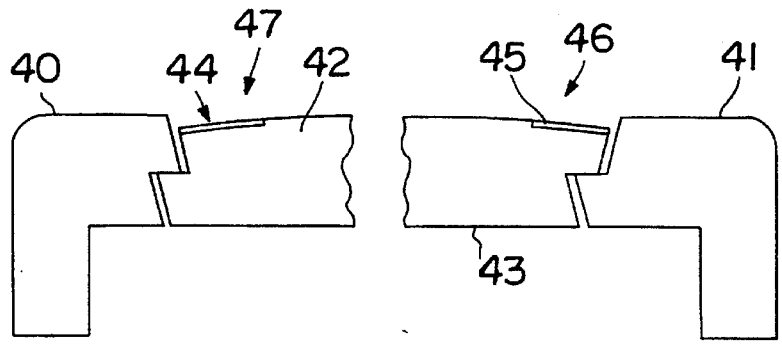
Figure 4:
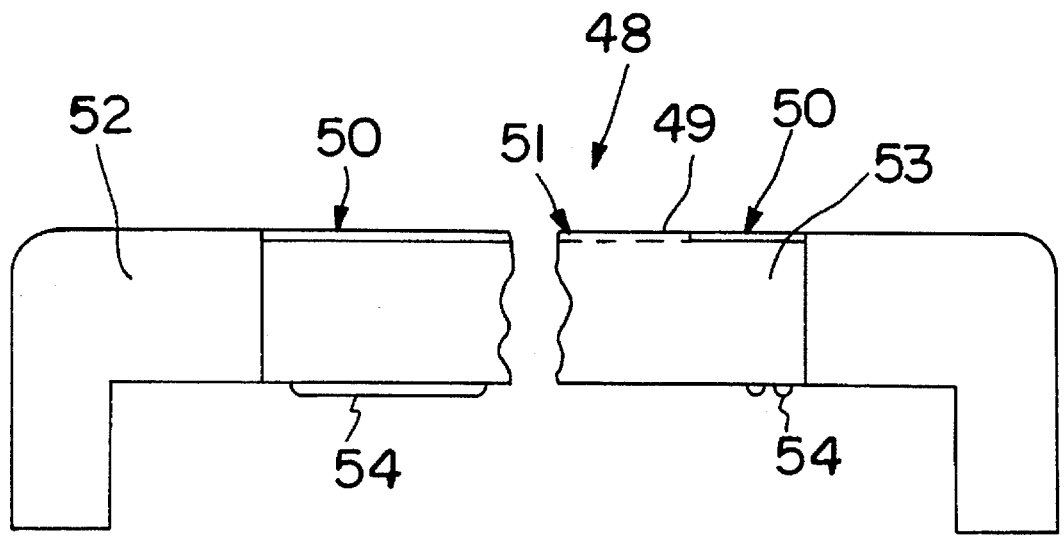

In the drawing:

FIG. 1a shows a compact cassette according to the invention having a window with an outer frame FIG. 1b shows the cassette from FIG. 1 having a window with a partially interrupted outer frame FIG. 1c shows the cassette from FIGS. 1 and 2 having a window with an outer frame given a particular design FIG. 2a shows a cassette half according to the prior art with fitted window part in plan view FIG. 2b shows a cross-sectional view along line of intersection II—II through the upper cassette housing half FIG. 3a shows the cassette according to the invention symbolized by a detail of a cross-sectional drawing such as FIG. 2b with a window fitted from outside for welding FIG. 3b is as FIG. 3a, but with a window fitted from inside for welding FIG. 3c is as FIG. 3a, but with a window fitted from outside for riveting FIG. 3d is as FIG. 3a, but with a multiply stepped window for an adhesive bond FIG. 4 is as FIG. 3a, but with a housing/window unit produced by two-color injection molding.

Figure 5:
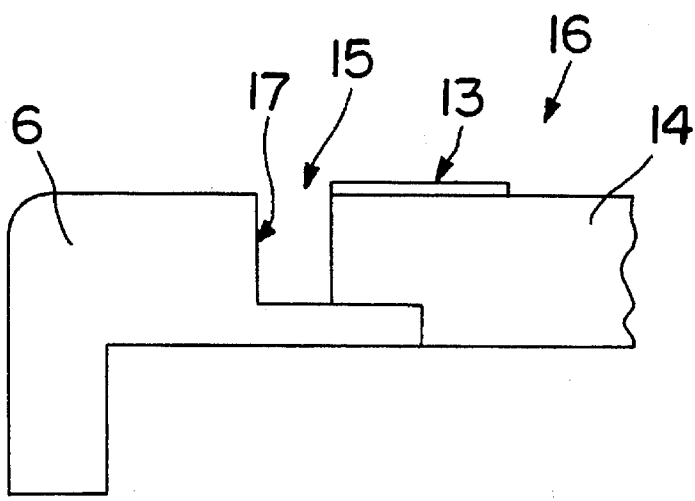

FIG. 5 is an embodiment wherein a space between the window and cassette body is provided to be covered by the outer frame.

The compact cassette K in FIG. 2a comprises a housing H and a window F, which is connected to the latter, for example in the form of points P, for example welded points, and in which the openings for entry of the drive spindles may also be provided. As can be seen in FIG. 2b, the housing H has a recessed edge R, on which the outer edge of the window F rests and in the region of which the fastening points, in this case represented as welding bosses SP, lie. If the two parts, the window F and the housing, are not both transparent, as is usual in the prior art, the housing H being colored and the window F being transparent, the fastening points P are visible only from inside the housing H. An externally neat design is obtained. This changes, however, as soon as both parts, the housing H and the window F, are fully or partly transparent, since the fastening points, or possibly areas, are then at least partially visible and the design of the cassette K may be significantly impaired.

FIG. 1a shows a compact cassette 5 according to the invention, essentially comprising the housing 6 and the window 7 which is connected to the latter and likewise contains openings 8 for the drive spindles of the apparatus. The window 7 is formed by a transparent central part 9 and a closed outer frame 10 as masking part.

In the cassette 5 in FIG. 1b, the same parts have the same designations as in FIG. 1a. What is different is the sectional outer frame 11, which surrounds the transparent part 12, which is provided with outer continuations due to the intermediate spaces produced.

FIG. 1c shows an outer frame 13 of an irregular design, which surrounds a correspondingly shaped designed transparent part 14. As indicated by a zig-zag line on the lower part of the outer frame 13, a regularly triangularly formed frame shape 13A can likewise be designed. In all shapes, only the covering function of the masking part of the window 7 is to be retained. As explained above, this is to cover over the fastening points, but it is quite conceivable also to cover over the entire inner frame of the housing 6 and/or also to conceal a distance 15 between a smaller window 16 and a larger housing recess 17 by the color of, for example, the outer frame 13 virtually matching or even corresponding to the color of the housing 6, cf. FIG. 5.

FIGS. 3a to 3d show various fitting possibilities of windows and housing recesses. In FIG. 3a, the housing 18 is provided with an outwardly open recess 19. The associated window 20 lies with a masking part 21, formed at this point as a step, and with a downwardly directed welding boss 22 in the recess 19 and is fastened thereto by means of welding. The transparent part 23 adjoins the masking part 21, which contains for example opacifiers, which are provided in particular in the region of the step and in this case also in the adjoining edge region and over the full window thickness D. The window 20 may be produced, for example, by injection molding.

FIG. 3b shows a geometrically somewhat reversed configuration in which the recess 24 of a housing 25 is downwardly open for receiving a stepped edge 26 of a transparent part 27 of a window 28. In this example, the welding boss 29 is attached to the edge of the recess 24 of the housing 25. The masking 30 at the point shown here is applied externally to the transparent part 27 in the edge region, for example by printing, adhesively fixing or impressing.

FIG. 3c shows a similar configuration to FIG. 3a, with a housing 31 having an upwardly open recess 32 with clearances 33 and a transparent part 34 with a stepped edge 35 and a riveting pin 36. The window 37 can consequently be connected to the housing 31 by means of riveting, which can be seen diagrammatically from the undeformed and deformed riveting pin 36. The outer surface of the transparent part 34 is masked by the in-mold application method, a masking film 38 in this case covering over the edge region and a transparent film 39 covering over the entire surface. The masking process takes place in the injection mold.

FIG. 3d shows two alternative step configurations of a housing 40, 41 and of a window 46, 47 and of a stepped transparent part 42 and 43 respectively, covering layers 44 and 45 also being provided in each case in the edge region. The covering layers may be formed and produced as in the examples of FIGS. 3b and 3c. Fastening may be performed by adhesively fixing in place.

FIG. 4 shows a further configuration with a housing 52 and a window 48, which are produced by the two-color injection molding process, the window 48 having been coated with a layer 49 on the surface in a printing and/or impressing process or provided with an impressed layer, comprising a covering film 50 and a transparent film 51. The transparent part is designated 53. Such a configuration may be necessary if the two-color transitions of the injection moldings are not entirely satisfactory and masking improves the appearance in critical areas.

In embodiments described above, it is possible for all the housing parts to be opaque or partly opaque. In these cases, the masking part should be either of a similar color as the housing or a contrasting color to it. It is also possible, however, for the housing and the transparent part to be transparent and only the masking part to be partially or completely opaque. The shape of the cutout in the housing, which is for example bordered by the recess for the window, is, for the sake of simplicity, shown as rectangular in the examples described. However, any contour of the cutout can be used, as long as the housing part can still be produced, since the window is of course essentially adapted in its shape to the contour of the cutout, or more specifically to the contour of the window recess, if there is one.

According to the invention, a housing having a predetermined cutout contour can be used for a great number of windows of essentially the same outer shape, but different masking parts and consequently also different transparent parts, which constitutes a simplification in terms in production and, for variety design, offers all the possibilities for distinguishing from other containers or cassettes.

In particular, the welding bosses or ribs, riveting pins and/or riveting holes are expediently arranged on the window on the rear side of the masking part. In the rearside region of the masking part, guide elements 54 (FIG. 4) for the tape and/or the tape rolls of a tape cassette may also be formed on the window.

Producing the impression on the window for forming the masking part may be performed by injection molding.

A container having a viewing window essentially comprises a housing with a window which can be fastened to it or can be connected to it during production and is designed in one part as a transparent part and in another part as a masking part, in particular in the edge region. The aim is to cover over the fastening points. In addition, the advantage is obtained of using windows with a wide variety of maskings for the same housing, provided that the contours of the cutout and of the outline of housing and window are adapted at least substantially to one another. The plastic container with windows can be used for all packing and archiving purposes, in particular also as a cassette with a recording medium, for example a magnetic tape cassette.

We claim:

1. In a tape cassette having at least one viewing window, the window comprising at least one window part having circumferential outer edges, and the cassette comprising at least one housing part having a cut-out whose shape corresponds substantially to the circumferential outer edges of the window part, the window part and the housing part each consisting of separately molded parts for connection one onto the other, the improvement wherein comprising: the window part including a transparent portion and a masking portion, a shape of the masking portion being complementary to a shape of the transparent portion allocated thereto, the masking portion being physically connected to and optically masking off at least regions adjacent to the circumferential outer edges of the window part, so that a connection of the window part and the housing part becomes optically undetectable and any cosmetic inhomogeneities resulting from the connection of the window part and the housing part cannot be seen, and so that a number of cassette variations can be produced without having to change tooling for the window part, the cassette variations being produced from a variety of window parts, all of which fit the cut-out of the housing part and each of said variety of window parts having differing combinations of said masking portions and transparent portions, the fitting of different window parts to the housing part markedly changing an appearance of the cassette.

2. A tape cassette as claimed in claim 1, wherein the masking part comprises at least elements of a frame-like outer edge.

3. A tape cassette as claimed in claim 1, wherein the masking part is an outer frame on the window.

4. A tape cassette as claimed in claim 1, wherein the masking part has an at least similar color to the container housings.

5. A tape cassette as claimed in claim 1, wherein the masking part has a contrasting color to the color of the container housing.

6. A tape cassette as claimed in claim 1, wherein the masking part and the transparent part are of an irregular shape in relation to the shape of the window cutout.

7. A tape cassette as claimed in claim 1, wherein the masking part and the transparent part are of a regular shape with respect to the shape of the window cutout.

8. A tape cassette as claimed in claim 1, wherein the masking part is formed as an imprint on the window part.

9. A tape cassette as claimed in claim 1, wherein the window part is formed with an impressed masking part.

10. A tape cassette as claimed in claim 1, wherein the window part is provided with a complete print during the injection molding operation.

11. A tape cassette as claimed in claim 1, wherein the window part is fitted to the housing by means of a welded fastening.

12. A tape cassette as claimed in claim 1, wherein the window part is connected to the housing by means of a riveted fastening.

13. A tape cassette as claimed in claim 1, wherein the window part is fitted to the housing by means of an adhesive fastening.

14. A cassette as claimed in claim 3, wherein the masking portion of the window part and the housing part have a joint with each other and are at least similarly opaque, so that the joint between the two becomes optically indistinct.

15. A tape cassette as claimed in claim 14, wherein the masking part is arranged at least in the vicinity of the outer edge of the window part.

16. A tape cassette as claimed in claim 14, wherein the masking part comprises at least elements of a frame-like outer edge.

17. A tape cassette as claimed in claim 14, wherein the masking part is an outer frame on the window.

18. A tape cassette as claimed in claim 14, wherein the masking part and the transparent part are of an irregular shape in relation to the shape of the window cutout.

19. A tape cassette as claimed in claim 14, wherein the masking part and the transparent part are of a regular shape with respect to the shape of the window cutout.

20. A tape cassette as claimed in claim 14, wherein the masking part is formed as an imprint on the window part.

21. A tape cassette as claimed in claim 14, wherein the window part is formed with an impressed masking part.

22. A tape cassette as claimed in claim 14, wherein the window part is provided with a complete print during the injection molding operation.

23. A tape cassette as claimed in claim 14, wherein the window part is fitted to the housing by means of a welded fastening.

24. A tape cassette as claimed in claim 14, wherein the window part is connected to the housing by means of a riveted fastening.

25. A tape cassette as claimed in claim 14, wherein the window part is fitted to the housing by means of an adhesive fastening.

26. In a method for assembling a tape cassette having at least one viewing window and a housing of opaque material, said at least one viewing window comprising a window part having a circumferential outer shape and said housing having a cut-out and connection areas for said window part, the improvement wherein comprising: providing a window part which includes a transparent portion and a masking portion for optically masking-off at least said connection areas for said window part; producing a plurality of window parts with transparent portions and masking portions of different sizes and optical designs;

a plurality of housings having the same shape and identically formed cut-outs and provided with said connection areas for the window parts, circumferential outer shapes of the window parts being equal to one another and suitable to fit in the cut-outs of the cassette housings, the masking portions of each window part being arranged so that after insertion of the window parts in to the cut-outs, the connection areas are optically covered by the masking portions; and inserting and connecting the window parts in the cut-outs in the connection areas of the cassette housings so that without changing tooling for the window parts, a variety of said window parts of different optical designs and opaque cassette housings of the same shape are assembled together to markedly change the appearances of a plurality of cassettes after the assembling thereof and to provide undetectable joints between the window parts and the cassette housings, as well as to render undetectable any cosmetic inhomogeneities resulting from the connection of the window parts and the cassette housings.

* * * * *